United States Patent
Inn et al.

(10) Patent No.: US 7,002,263 B2
(45) Date of Patent: Feb. 21, 2006

(54) ELIMINATION OF RECIRCULATION CURRENT LOSS IN LOAD-SHARED SWITCHING MODE POWER SUPPLIES

(75) Inventors: Bruce Inn, San Jose, CA (US); Ramesh Selvaraj, Santa Clara, CA (US)

(73) Assignee: Micrel, Incorporated, San Jose, CA (US)

( * ) Notice: Subject to any disclaimer, the term of this patent is extended or adjusted under 35 U.S.C. 154(b) by 26 days.

(21) Appl. No.: 10/864,014

(22) Filed: Jun. 9, 2004

(65) Prior Publication Data

US 2005/0275290 A1    Dec. 15, 2005

(51) Int. Cl.
*H02J 1/12* (2006.01)
(52) U.S. Cl. .......................................... 307/55; 307/24
(58) Field of Classification Search ................. 307/18, 307/24, 31, 32, 51–53, 55, 57, 58, 60, 82; 323/272; 363/65
See application file for complete search history.

(56) References Cited

U.S. PATENT DOCUMENTS

| | | |
|---|---|---|
| 4,074,146 A | 2/1978 | Buonavita |
| 4,136,286 A | 1/1979 | O'Halloran et al. |
| 4,258,552 A | 3/1981 | Ryker et al. |
| 4,425,613 A | 1/1984 | Shelly |
| 4,521,842 A | 6/1985 | Kammiller |
| 5,157,269 A | 10/1992 | Jordan et al. ................. 307/59 |
| 5,745,356 A | 4/1998 | Tassitino, Jr. et al. |
| 5,838,151 A | 11/1998 | Myers et al. |
| 6,009,000 A * | 12/1999 | Siri ........................ 363/21.09 |
| 6,038,154 A | 3/2000 | Boylan et al. ............. 363/127 |
| 6,118,680 A | 9/2000 | Wallace et al. |
| 6,166,455 A | 12/2000 | Li ................................ 307/43 |
| 6,166,934 A | 12/2000 | Kajouke et al. ............. 363/65 |
| 6,381,157 B1 | 4/2002 | Jensen |
| 6,414,469 B1 * | 7/2002 | Zhou et al. ................. 323/272 |
| 6,465,909 B1 | 10/2002 | Soo et al. |
| 6,608,402 B1 | 8/2003 | Soo et al. |
| 6,768,658 B1 * | 7/2004 | Perry .......................... 363/65 |
| 6,800,962 B1 * | 10/2004 | Bahl et al. .................... 307/52 |
| 6,819,577 B1 * | 11/2004 | Wiktor et al. ................ 363/72 |

* cited by examiner

Primary Examiner—Gary L Laxton
(74) Attorney, Agent, or Firm—Ladas & Parry LLP

(57) ABSTRACT

In master-slave current-tracking load-share systems using switching power supplies, a method and apparatus for preventing current recirculation at light-load and no-load operational conditions. The slave power supply is run in a discontinuous mode when load current falls to light-load or no-load state, preventing the slave from sinking current, therefore preventing recirculation from the master to the slave. The slave power supply is run at a lower current level than the master, preventing recirculation from the slave to the master.

13 Claims, 7 Drawing Sheets

(PRIOR ART PROBLEM)

(PRIOR ART PROBLEM)

ELIMINATION OF RECIRCULATION CURRENT LOSS IN LOAD-SHARED SWITCHING MODE POWER SUPPLIES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO AN APPENDIX

Not applicable.

BACKGROUND

1. Technical Field

The technology described herein is generally related to the field of electrical circuits and power supply systems and, more particularly, to a system in which multiple power supplies, having switching modes of operation, are connected to a given load.

2. Description of Related Art

For many applications, it may be preferred that a load be powered from multiple power supplies working in concert rather than from one, more powerful, supply. This technique is generally referred to in the art as "load sharing." High output power supplies are generally inefficient and slow. Smaller, common-use-sized, power supplies generally are more easily obtained, repaired and cost efficient.

In a load-shared, switching mode system, the multiple power supplies connected to the load are equipped to communicate with one another as to how much load demand each is supplying, generally to the purpose of sourcing approximately equal shares of the load current. There are several scenarios where load sharing is preferable.

In high-reliability or high-up-time load systems, it may be desired that redundant power supplies be available for increasing mean-time-between-failure (MTBF). Power may be supplied by multiple supplies, each running at a fraction of capacity, which allows the load to continue to operate even when one supply fails.

In low-noise systems, it may be desirable to run switching power supplies with their respective clocking out-of-phase to produce a composite power line to the load with reduced ripple current and noise.

A common approach to load-sharing systems uses switching power supplies as the basic building blocks because each has a generally high efficiency, small size per watt of output, and low weight. FIG. 1 (Prior Art) shows a typical shared "Load" system. The output current "$I_{LD2}$" of the Power Supply 2 "Slave" tracks the output current "$I_{LD2}$" of the Power Supply 1 "Master."

It is known that as well as being a power source, a commercial switching power supply can also become a current sink. When switching power supplies and controls are used in a commonly known master-slave configuration as shown in FIG. 1 (Prior Art), there is a need to prevent a condition in which any one of the power supplies sinks current from another. This phenomenon is referred to as "current recirculation," where electrical current is drawn from a first unregulated source by one supply system and absorbed and returned to a second unregulated source supply system. Typical problems resultant from this phenomenon are illustrated by FIGS. 2 and 3. FIG. 2 (Prior Art Problem) illustrates increased power dissipation due to recirculation of current in a two unregulated power sources system. FIG. 3 (Prior Art Problem) illustrates a recirculation condition where current is returned to a source and the source is thereby lifted in voltage which could cause an over-voltage fault condition to be triggered. In other words, if the power supplies are connected in the common current-tracking master-slave configuration where the slave tries to match its output current to that of the master, then at low load currents, voltage offset in the tracking circuitry of the slave may in fact command the slave to run a negative current, that is, the slave may sink current. It could also be that the master sinks current from the slave.

One technique for attempting to prevent current recirculation is to use power supplies that cannot sink current. An example of this approach would be a load-sharing design using linear power supplies with emitter follower outputs. This approach has a drawback in that such power supplies are increasingly inefficient the greater the unregulated voltage is relative to the load voltage. Another technique is to build load-sharing power supply systems which use switching supplies that only operate in a discontinuous mode—generally defined as not allowing inductor current to flow when the direction of current flow would be from a load back into a power supply. This approach is not power-efficient and has a poorer transient response than non-discontinuous mode supplies. Still another approach tries to minimize current recirculation by putting limits on the offset voltage in the slave amplifier.

There is a need for better load-shared, switching mode, power supply systems.

BRIEF SUMMARY

The present invention generally provides a method and apparatus for substantial elimination of the occurrence of current recirculation in load-shared, switching mode, power supply systems.

The foregoing summary is not intended to be inclusive of all aspects, objects, advantages and features of the present invention nor should any limitation on the scope of the invention be implied therefrom. This Brief Summary is provided in accordance with the mandate of 37 C.F.R. 1.73 and M.P.E.P. 608.01 (d) merely to apprise the public, and more especially those interested in the particular art to which the invention relates, of the nature of the invention in order to be of assistance in aiding ready understanding of the patent in future searches.

BRIEF DESCRIPTION OF THE DRAWINGS

FIGS. 4A, 4B, and 4C illustrate features in accordance with an exemplary embodiment of the present invention in which:

FIG. 4A is a simplified block diagram illustrating running a slave power supply system as a lower current supply than the master power supply subsystem, FIG. 4B is a graph related to operation of the illustrated system, and FIG. 4C is a simplified block diagram illustrating discontinuous conduction mode operation for a slave power supply subsystem.

Like reference designations represent like features throughout the drawings. The drawings in this specification should be understood as not being drawn to scale unless specifically annotated as such.

DETAILED DESCRIPTION

A method and apparatus is provided for preventing current recirculation at light-load and no-load operational conditions for master-slave current-tracking load-share systems using switching power supplies. The slave power supply is run in a discontinuous mode when load current falls to light-load state, preventing the slave from sinking current, therefore preventing recirculation from the master to the slave. The slave power supply is run at a lower current level than the master, preventing recirculation from the slave to the master.

Figure 1:
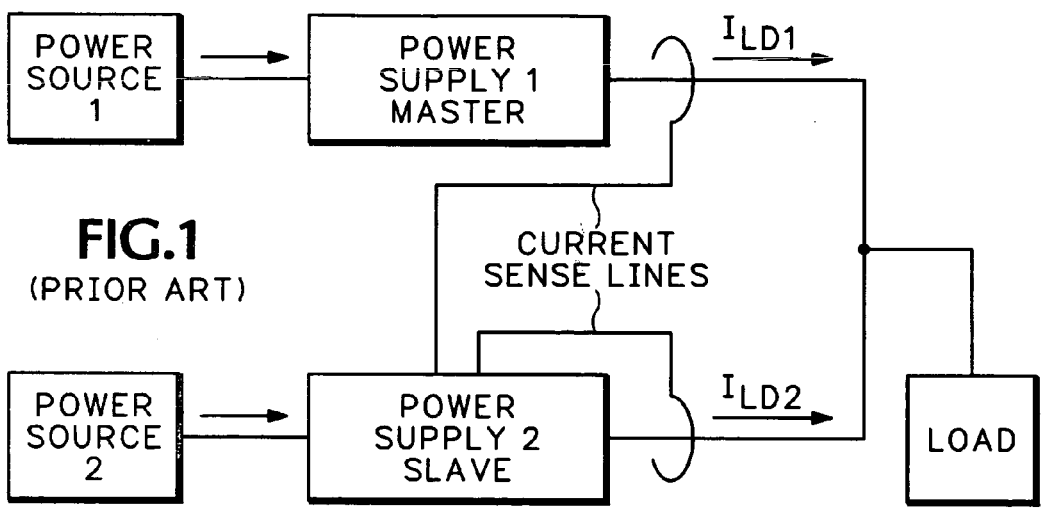
FIG. 1 (Prior Art) illustrates a system having two unregulated power sources.
Figure 2:
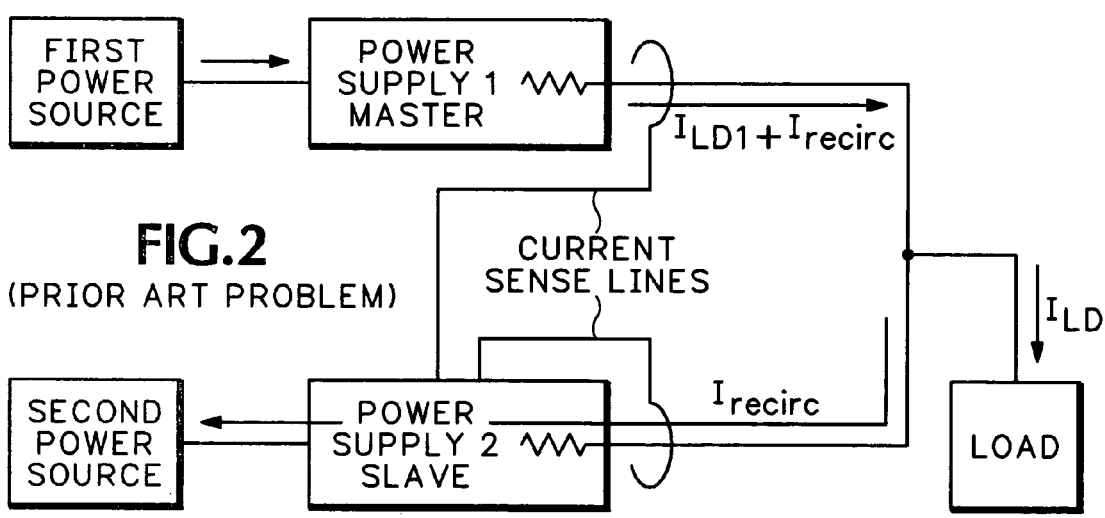
FIG. 2 (Prior Art Problem) illustrates increased power dissipation due to recirculation of current in a system as shown in FIG. 1.
Figure 3:
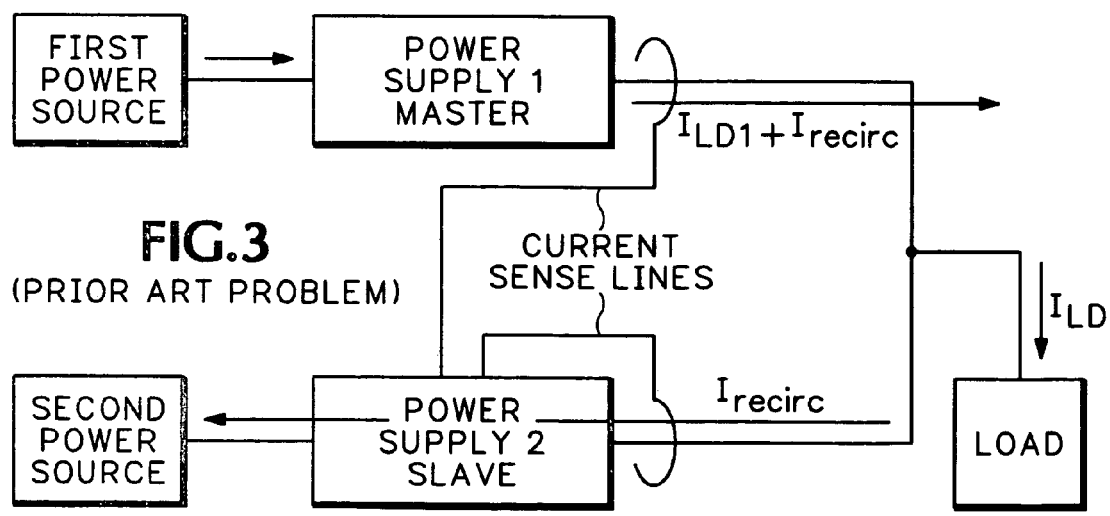
FIG. 3 (Prior Art Problem) illustrates lifting of unregulated source voltage due to recirculation of current in a system as shown in FIG. 1.
Figure 4A:
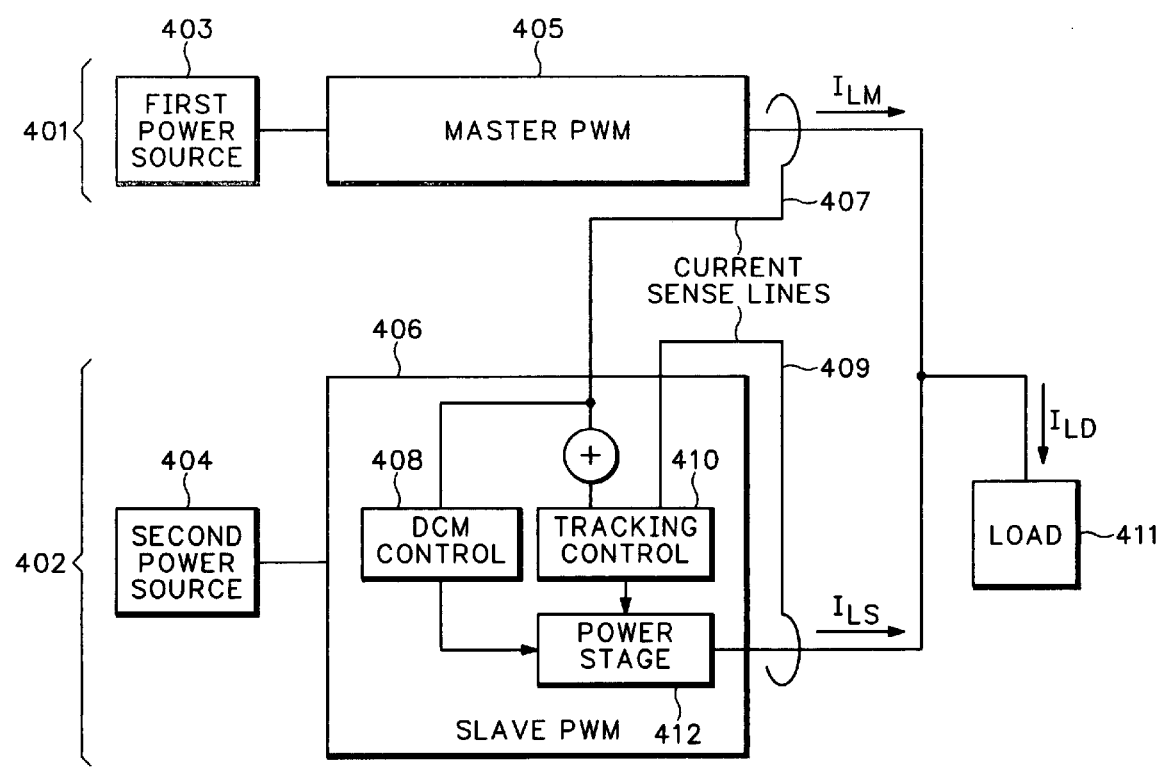

Turning now to FIG. 4A, a first switching power supply subsystem 401 and a second switching power supply subsystem 402 are connected in a commonly known manner for a shared load, "Load," 411. Each subsystem 401, 402 has a respective unregulated power source 403, 404 electrically connected to a respective pulse width modulation switching regulator 405, 406 for supplying the power demand of the load 411. As described in the Background, the subsystems 401, 402 are used as switching-type power supplies in a "Master" and "Slave" configuration such that a net electrical current, illustrated as an arrow labeled "$I_{LD}$" is supplied to the load 411. While a variety of power supply regulators and controllers are known in the art, for the purpose of describing the present invention, known manner pulse width modulation ("PWM") type regulated, switched, power supply operation is employed (see e.g., U.S. Pat. No. 4,479,174, incorporated herein by reference). No limitation on the scope of the invention is intended by the inventors from the use of this PWM exemplary embodiment nor should any be implied therefrom; it will be recognized by those skilled in the art that the invention may be adapted as needed for other specific implementations.

In general, a slave PWM switching regulator power supply, shown as "Slave PWM," 406 (for convenience also referred to more succinctly hereinafter as just "Slave 406") includes a "DCM control" subunit 408 (where "DCM" is an abbreviation for "discontinuous mode"), a "Tracking control" subunit 410 (for convenience also referred to more succinctly hereinafter as just "Tracking 410"), and a "Power stage" subunit 412, such as a known manner inductor driven current source circuit. In a first basic aspect of the present invention, the Slave PWM 406 runs its Power stage subunit 412 at a level so as substantially always to source less electrical current to the Load 411 than a Master switching regulator power supply, shown as "Master PWM," 405 (for convenience also referred to more succinctly hereinafter as just "Master 405"). Tracking 410 monitors—illustrated as "Current sense lines" 407, 409—the respective electrical output currents for both the Master 405 and Slave 406, providing control signals to the Power stage subunit 412 accordingly and regulating the Slave 406 output.

Figure 4B:
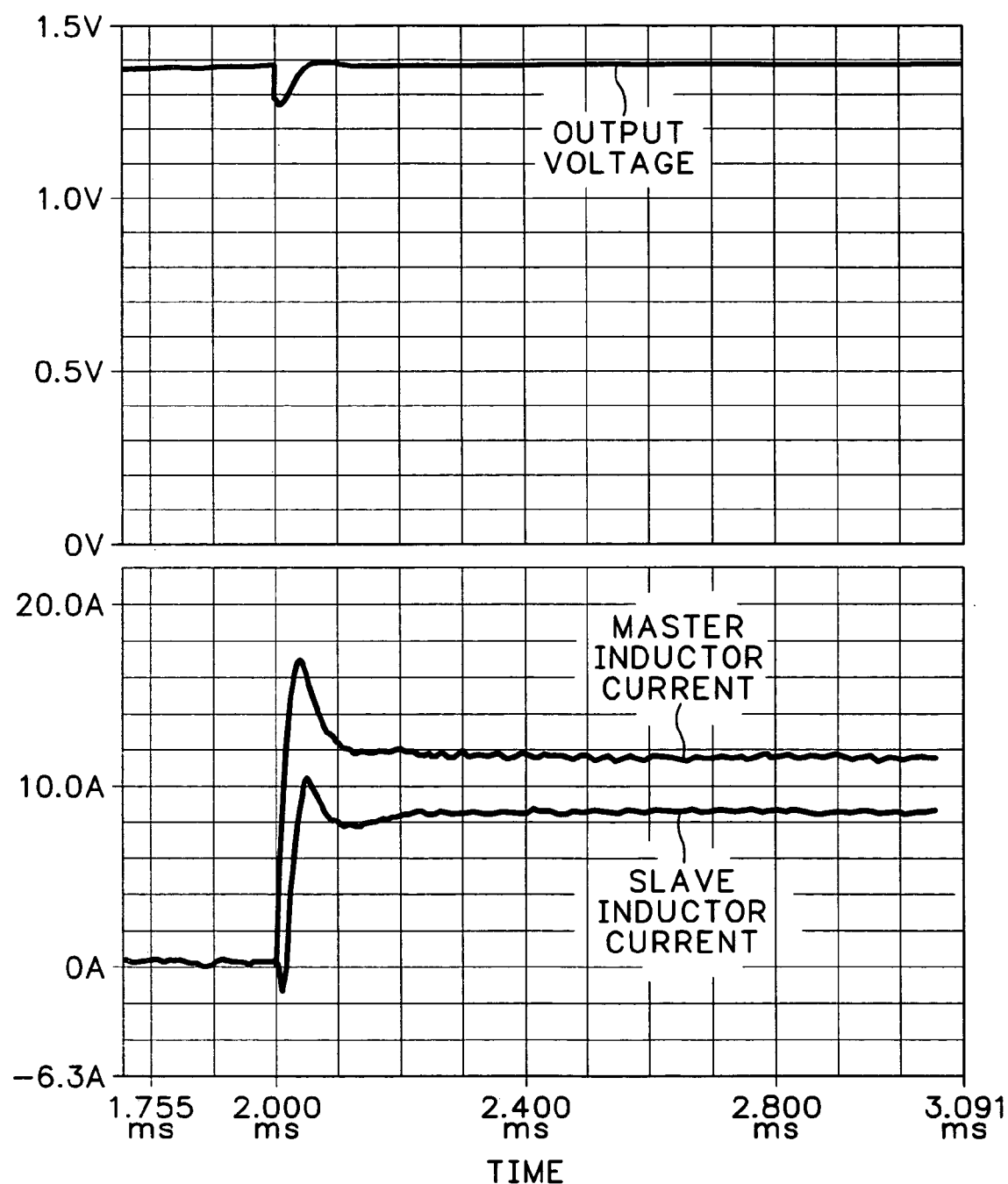

Turning also to FIG. 4B, an example of a typical running condition is illustrated. When the load is in an OFF state, to the left of Time 2.00 ms, no current is supplied from the power supply systems 401, 402. A relatively stable "Output voltage" level of approximately 1.4V is shown. When the Load 411 is turned ON, a transient stage, from approximately Time 2.00 ms to Time 2.05 ms occurs. While going from a no-load or relatively light-load condition prior to Time 2.00 ms to a heavy-load condition at Time 2.10 ms may be somewhat slower due to the fact that the error loop must change duty cycle significantly—as will be explained in more detail when describing the DCM control 408 hereinafter—it can be seen that the Master 405 still responds relatively quickly to a transient for Output voltage at Time 2.00 ms when the Load 411 goes into a relatively heavy load state. The Slave 406 catches up relatively quickly such that the current ILD (FIG. 4A) is stable by Time 2.20 ms. The "Slave inductor current," $I_{LS}$ is controlled at a level so as substantially constantly to be lower than the "Master inductor current," $I_{LM}$. In other words, as Tracking 410 recognizes via the current sense line 407, 409 both electrical current output levels for both switching power supply subsystems 401, 402, it maintains the Slave 406 output at a predetermined lower value than that of the Master 405.

Figure 4C:
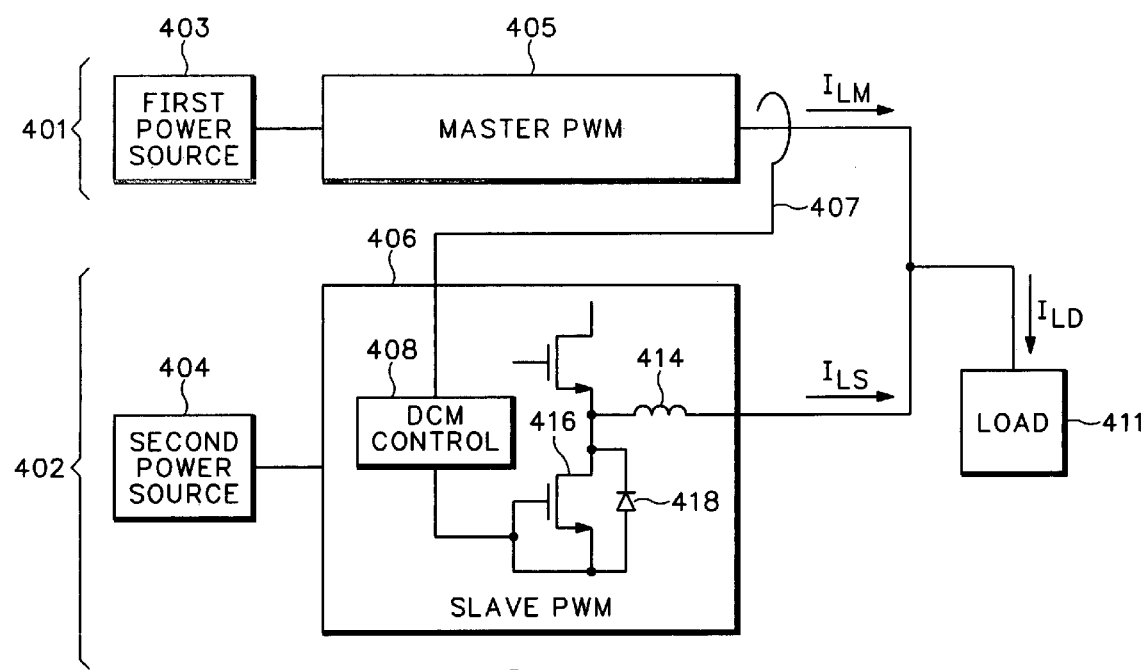

A second basic aspect of the present invention is illustrated in FIG. 4C. When load current $I_{LD}$ falls into a relatively light-load region, the Slave 406 is made to run in the discontinuous mode (DCM), preventing the Slave switching power supply subsystem 402 from sinking current. The DCM control subunit 408 also tracks 407 the Master 405 output current $I_{LM}$. Generally, when the Master 405 output current $I_{LM}$ falls to a predetermined low—the value depending upon the specific implementation—the DCM control 408 blocks the path to the Slave 406 rather than allowing the Slave 406 to operate as an electrical current sink. In general, the DCM control 408 runs the Slave 406 in a synchronous mode when the Slave 402 is sourcing current to the Load 411 and an asynchronous mode when a light-load or no-load condition exists.

In the particular implementation shown, when the Master 405 output current falls to the predetermined low, DCM control 408 pulls a power MOSFET 416 gate low, turning OFF the MOSFET 416. A second MOSFET 417 is provided for balancing the circuit. Inductor 414 current ground return is only through a diode 418 appropriately connected in parallel with the MOSFET 416. Therefore the inductor 414 current will be forced to a zero current state rather than into a negative flow state, or current sink, were the MOSFET 416 still ON. While this may result in some loss of efficiency overall by letting low side conduction be switched trough the inherent diode of a MOSFET, since the Slave 406 DCM operation is only for low-load current conditions, the loss has been found not to be operationally significant for most implementations.

Figure 5:
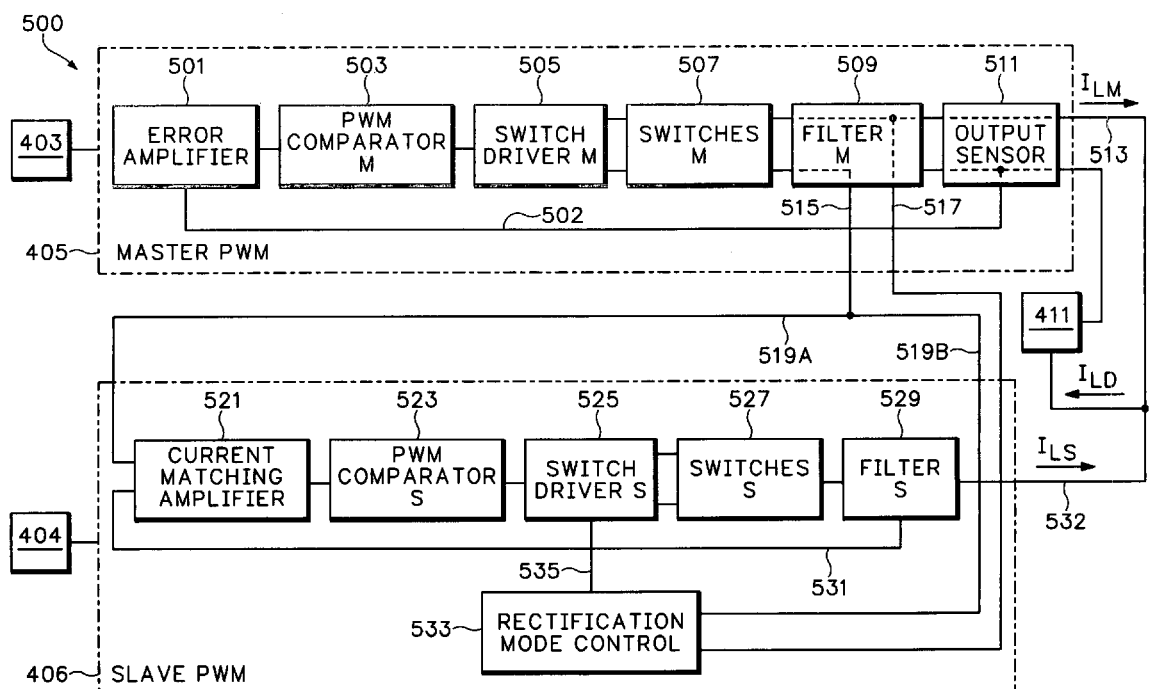
FIG. 5 is a detailed system block diagram for a specific exemplary implementation in accordance with the present invention exemplary embodiment as shown in FIGS. 4A, 4B, and 4C.
Figure 6A:
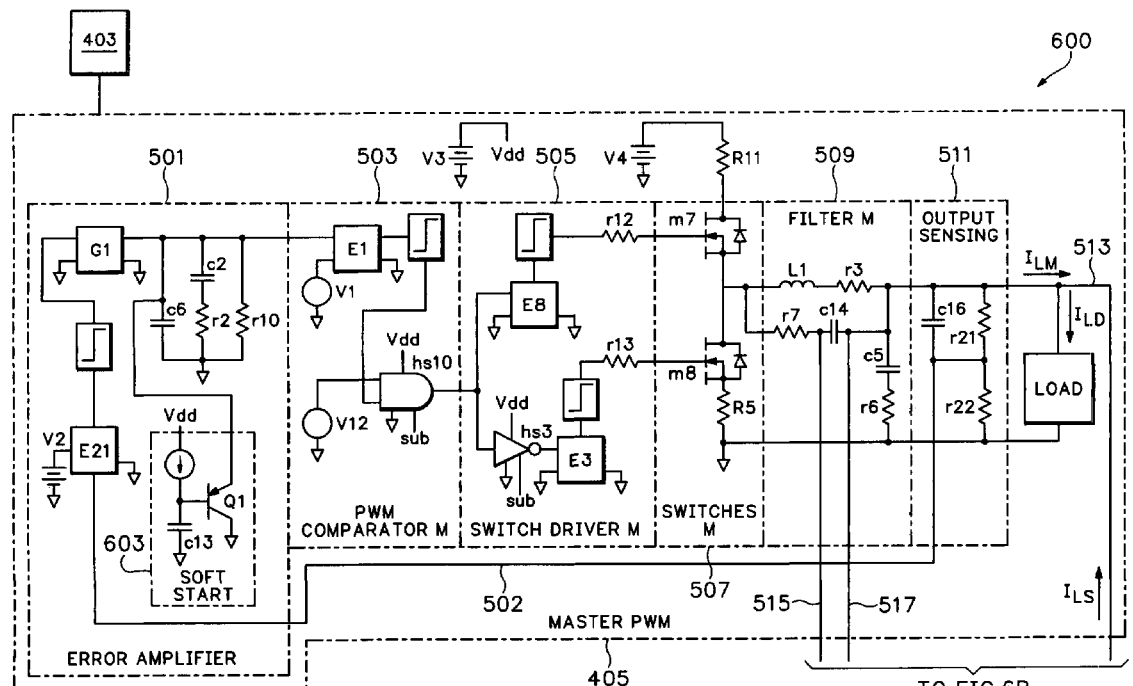
FIG. 6 is a detailed circuit diagram for one implementation of the block diagram exemplary embodiment as shown in FIG. 5.
Figure 6B:
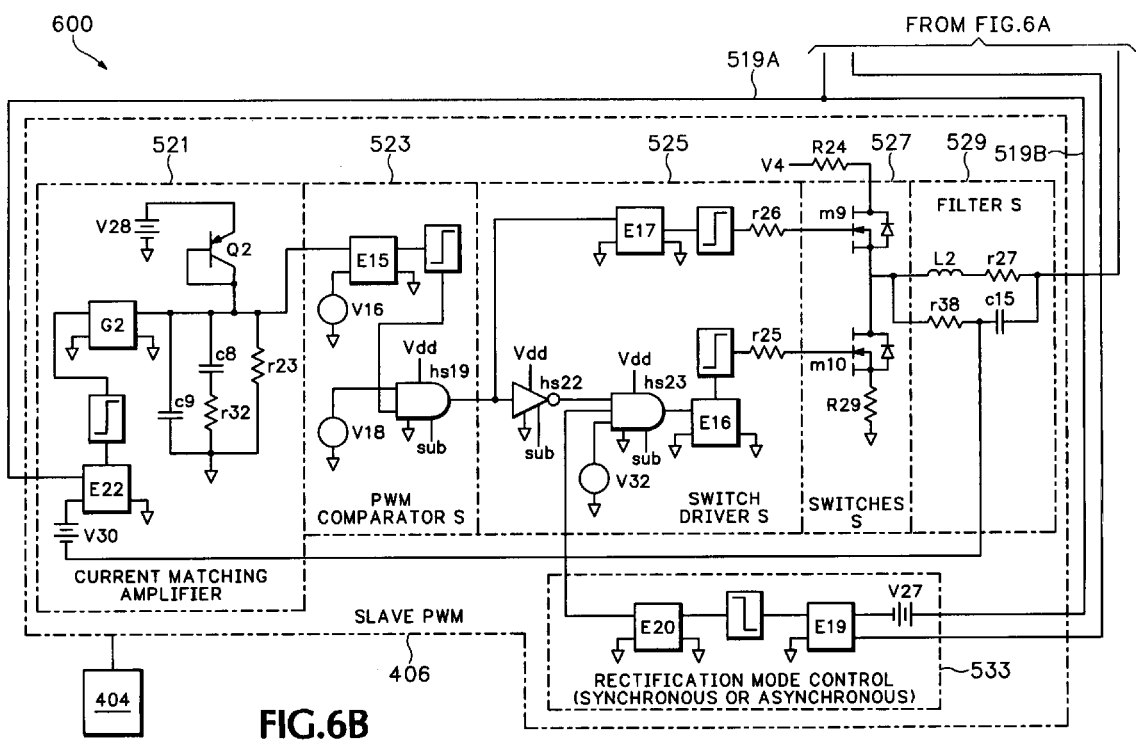

FIG. 5 is a detailed system block diagram for a specific exemplary implementation for the system 500 in accordance with the present invention exemplary embodiment as shown in FIGS. 4A, 4B, and 4C. The unregulated power sources 403, 404 and load 411 are each shown in generic black box form and require no further explanation. As described with respect to FIGS. 4A, 4B, and 4C, the basic control provided by the Master 405 and Slave 406 are implemented using pulse width modulation techniques. FIG. 6 is a detailed circuit 600 diagram for one specific, exemplary, implementation of the block exemplary embodiment as shown in FIG. 5. FIG. 6 is provided using standard circuit design symbols; with the individual elements and known manner functions thereof being recognizable by persons skilled in the art, no further description of each shown symbol is required for a complete understanding of the present invention. Again, as the development of various on-board chip voltage sources and current sources used as reference levels or for individual component drives such as illustrated in FIG. 6 will be well known to persons skilled in the art, no further explanation is required for a complete understanding of the present invention. It will also be recognized by those skilled in the art that the Master-Slave subunits—designated by "M" and "S" respectively in FIGS. 5 and 6—may be implemented using known manner integrated circuit ("IC") technology and may be reduced to a single integrated circuit die, or chip.

In the Master 405, an error amplifier 501 is used for comparing Master output voltage, via feedback loop connection trace 502, to a reference voltage, and providing regulation for the Master output. The output of the error amplifier 501 is a voltage which is used to set the duty cycle of a Master (designated by "M") PWM comparator 503. The PWM comparator 503 provides a drive signal to a Master switch driver 505 for Master complementary switches 507 for driving either high load or low load conditions depending upon the nature of the specific implementation load itself. In this embodiment, there are two alternative ON-OFF switches 507 in tandem and therefore the switch driver 505 has two outputs and is configured to turn one switch ON and the other OFF. The respective outputs of the switches 507 provides the appropriate Master 405 PWM signal output to a Master output filter 509. The filter 509 receives its inputs from the switches 507 and in turn provides the appropriate Master 405 PWM signal output to both an output sensor 511—for the feedback 502 to the error amplifier 501 as described above—and ultimately the load 411 via node 513. Further, the filter 509 routes the Master 405 PWM signal output to the Slave 406 for tracking control and DCM control as also described with respect to FIGS. 4A, 4B, and 4C and hereinafter.

Turning now to the Slave 406 components of FIGS. 5 and 6, a current matching amplifier 521 receives a signal representative of the Master 405 output current $I_{LM}$ from the Master filter 509 via connection traces 515, 519A. The current matching amplifier 521 also receives a signal representative of the Slave 406 output current $I_{LS}$ from a Slave (designated by "S") output filter 529 via connection trace 531. The current matching amplifier 521, rather than providing regulation of output as does the Master error amplifier 501, instead provides inductor current matching between the Master and Slave for load sharing substantially in the same manner illustrated in FIG. 4B and described hereinbefore; in other words, forcing the Master to run a higher current than the Slave to the load. To accomplish this end, the inputs to the current matching amplifier may be signals tapped from an output inductor in the Master filter 509 via connection traces 515 and from an output inductor in the Slave filter 529 via connection trace 531. The current matching amplifier 521 output provides a duty cycle signal output to a Slave PWM comparator 523 which in turn provides sequential signals to a Slave switch driver 525, Slave switches 527, and a Slave output filter 529 connected via trace 532 to the load 411 via node 513, in substantially the same manner and function as the Master 405 described hereinbefore. A significant difference is, as described in detail with respect to FIGS. 4A, 4B, and 4C, that the Slave output current $I_{LS}$ is maintained by the Slave 406 at a substantially consistent level which is less than the Master output current $I_{LM}$. Note that this also ensures that only the Slave 406 could be a current sink were current recirculation allowed. In accordance with achieving the goals of the present invention, however, it is important to control and substantially altogether prevent the low-load or no-load state wherein in such a synchronous master-slave condition, as described in the Background, the Slave switch 527 might provide such a bidirectional path allowing current recirculation.

Therefore, as also described particularly with respect to FIG. 4C, a discontinuous mode of operation is implemented for the Slave 406, shown in FIGS. 5 and 6 as the "rectification mode control" ("RMC") subunit 533 (more simply referred to hereinafter as the "RMC 533"). Fundamentally, it is a basic function of the RMC 533 effectively to disable the Slave 406 during light-load and no-load condition of the overall system 500, thereby substantially blocking and preventing any recirculation current condition from arising where the Slave sinks current from the Master 405. From the Master output filter 509, the RMC 533 receives via connection traces 515, 519B a signal representative of the Master output at the Master switches 507 output, and via connection trace 517, a signal representative of the Master filter 509 output such that the signals on traces 515, 519B and on trace 517 represent the difference therebetween. A Master current $I_{LM}$ drop to the load 411 will thus be detected by the RMC 533 using a predetermined reference level for comparison. At a predetermined level of drop-off of the Master current $I_{LM}$, the RMC 533 puts the Slave 406 into an asynchronous mode of operation via a signal output from the RMC 533 on connection trace 535 to the Slave switch driver 525, effectively blocking the Slave 406 from sinking electrical current. In other words, as the current to the load 411 decreases, the duty cycle signal from the current matching amplifier 521 to the Slave PWM amplifier 523 also decreases until it essential is in a zero-duty cycle state and the low-load/no-load switch of Slave switches 527 is made to be unidirectional. Once load demand increases sufficiently, the heavy-load condition sides of switches 507, 527 are again enabled and the Slave 406 is returned to the synchronous mode.

While dependent on the specific implementation developed from the generically described present invention, it may be stated generally that the relationship between a reference level used by the RMC 533 for putting the Slave 406 into the asynchronous mode is related to the current matching amplifier 521 offset—that is a change in the difference between Master inductor current and Slave inductor current (see e.g., FIG. 4B)—should be predefined. A reference level in the current matching amplifier 521 is used to define the intentional offset, in other words and expected ILS<ILM offset. Thus, the reference level chosen for the current matching amplifier 521 should be a value such that when the RMC 533 senses that the sum total of systematic offsets with respect to its reference level is greater than or equal to the intentional offset, the Slave 406 is left in the synchronous mode of operation, supplying $I_{LS}$ to the load 411, and when the sum total of systematic offsets is less than the intentional offset, the asynchronous mode is triggered. In other words, any implementation should be designed so that there is enough intentional offset mismatch between the master inductor current and the slave inductor current wherein a change can be detected with respect to the current matching amplifier 521 and RMC 533 reference levels.

As an optional feature for loads requiring a ramped initial start up, a known manner soft start circuit 603 is provided.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A load-shared power supply regulating system comprising:
   a first power regulating means for providing a first electrical current to a load; and
   a second regulating means for providing a second electrical current to the load, wherein said second regulating means provides the second electrical current at a level that is substantially constantly less than said first electrical current, and said second regulating means is switched to a discontinuous mode when said first electrical current level is approximately less than a predetermined reference level.

2. The system as set forth in claim 1 comprising:
   said second power regulating means includes means for tracking output current from said first power regulating means to the load and for following said output with said second electrical current until said output falls to the predetermined reference level.

3. The system as set forth in claim 1 comprising:
   means for controlling rectification mode of said second power regulating means.

4. The system as set forth in claim 1 comprising:
   said second power regulating means includes means for switching said second power regulating means between synchronous or asynchronous operation with respect to said first power regulating means.

5. The system as set forth in claim 4 wherein said second power regulating means is in a mode comprising said synchronous operation when said first power regulating means output current is approximately above said predetermined reference level and in a mode comprising said asynchronous operation when said first power regulating means is approximately at or below said predetermined reference level.

6. A load-sharing switching power supply system for a given load, the system comprising:
   a first power source;
   connecting the first power source to the load, a master regulator supplying a first electrical current to said load;
   a second power source;
   connecting the second power source to the load, a slave regulator supplying a second electrical current to said load such that said second electrical current is substantially always offset to be less than said first electrical current and wherein said slave regulator is controlled such that when power demand by the load is approximately less than a predetermined demand, the slave regulator discontinues providing said second electrical current and prevents sinking of substantially any part of said first electrical current by said slave regulator.

7. The system as set forth in claim 6 comprising:
   said slave regulator includes a rectification mode control subunit for controlling when the slave regulator discontinues providing said second electrical current and prevents sinking of substantially any part of said first electrical current by said slave regulator.

8. The system as set forth in claim 6 wherein said rectification mode control forces said slave regulator into asynchronous condition when said power demand by the load is approximately less than the predetermined demand.

9. The system as set forth in claim 8 wherein said rectification mode control forces said slave regulator into synchronous condition when said power demand by the load is approximately equal to or greater than the predetermined demand.

10. The system as set forth in claim 6 said slave regulator comprising:
    tracking control circuitry for monitoring current output from said master regulator to said load and for maintaining current output from said slave regulator at said offset.

11. A method for substantially eliminating electrical current recirculation in a load-shared switching mode power supply system for a given load, the method comprising:
    during normal-to-heavy load conditions, running a slave power supply subsystem at a first electrical output current to said given load that is substantially consistent at an offset value less than a second electrical output current of a master power supply subsystem to said load such that said master power supply subsystem can not operate as an electrical current sink with respect to said slave power supply subsystem; and
    during light-to-no load conditions, discontinuing the first electrical output current from said slave power supply and blocking said slave power supply from operating as an electrical current sink with respect to said master power supply subsystem.

12. The method as set forth in claim 11 comprising:
    setting a reference level defining the offset value wherein when a sum total of systematic offsets with respect to the reference level is greater than or equal to the offset value, the slave power supply is in a synchronous mode of operation and when the sum total of the systematic offsets is less than the offset value, the slave power supply is in an asynchronous mode.

13. The method as set forth in claim 11 wherein there is enough intentional offset mismatch between master current output level and slave current output level wherein a change can be detected with respect to given reference levels.

* * * * *